US012304117B2

United States Patent
Olivieri (10) Patent No.: US 12,304,117 B2
(45) Date of Patent: May 20, 2025

(54) DEFLASHING MACHINE AND METHOD OF DEFLASHING A LENS-MOLD-ASSEMBLY

(71) Applicant: Essilor International, Charenton-le-pont (FR)

(72) Inventor: Francois Olivieri, Charenton-le-pont (FR)

(73) Assignee: Essilor International, Charenton-le-pont (FR)

( * ) Notice: Subject to any disclaimer, the term of this patent is extended or adjusted under 35 U.S.C. 154(b) by 137 days.

(21) Appl. No.: 18/017,321

(22) PCT Filed: Jul. 23, 2021

(86) PCT No.: PCT/EP2021/070693
§ 371 (c)(1),
(2) Date: Jan. 20, 2023

(87) PCT Pub. No.: WO2022/018267
PCT Pub. Date: Jan. 27, 2022

(65) Prior Publication Data
US 2023/0256656 A1 Aug. 17, 2023

(30) Foreign Application Priority Data
Jul. 24, 2020 (EP) ..................... 20305855

(51) Int. Cl.
*B29C 37/02* (2006.01)
*B29D 11/00* (2006.01)
*B29L 11/00* (2006.01)

(52) U.S. Cl.
CPC ........ *B29C 37/02* (2013.01); *B29D 11/00413* (2013.01); *B29L 2011/0016* (2013.01)

(58) Field of Classification Search
CPC .................................................... B29C 37/02
(Continued)

(56) References Cited

U.S. PATENT DOCUMENTS 835,341 A * 11/1906 Winfree .................... B23B 5/00
409/165
2,554,777 A * 5/1951 Dangin ................ A46D 1/0284
15/207.2
(Continued)

FOREIGN PATENT DOCUMENTS

AU 8432909 A * 3/1985 ............. B29C 37/02
CN 109676840 4/2019
(Continued)

OTHER PUBLICATIONS

International Search Report and Written Opinion in corresponding PCT Application No. PCT/EP2021/070693, mailed Oct. 25, 2021.

*Primary Examiner* — Timothy Kennedy
(74) *Attorney, Agent, or Firm* — Norton Rose Fulbright US LLP (57) ABSTRACT

A deflashing machine (100) including a lens-mold-assembly-rotation mechanism (110) having a coaxially aligned first and second rotary parts (112, 114). The first and second rotary parts (1112, 114) being operable for holding the lens-mold-assembly (102) therebetween, and rotatable about a common axis (113). The machine further includes a deflashing mechanism (120) having a first blade (130) and a second blade (140) disposed at a first radial position and a second radial position from the common axis (113) respectively. The first blade (130) having a trimming edge (132) parallel to the common axis (113) for engaging a circumferential surface of the lens-mold-assembly (102) held between the first rotary part (112) and the second rotary part (114). The second blade (140) having a trimming edge (142) radially aligned with respect to the common axis (113) for engaging a convex surface (106) or a concave surface (101) of the lens-mold-assembly (102) held between the first rotary part (112) and the second rotary part (114).

15 Claims, 4 Drawing Sheets

(58) Field of Classification Search
USPC .......................................... 264/161; 425/806
See application file for complete search history.

(56) References Cited

U.S. PATENT DOCUMENTS

| | | | | |
|---|---|---|---|---|
| 2,586,663 | A * | 2/1952 | Keck | B29C 43/02 |
| | | | | 29/27 R |
| 2,670,645 | A * | 3/1954 | Pipper | B29C 37/02 |
| | | | | 425/806 |
| 2,726,412 | A * | 12/1955 | Heinrich | B29C 37/02 |
| | | | | 12/88 |
| 2,779,414 | A * | 1/1957 | Broden | B29C 37/02 |
| | | | | 82/83 |
| 3,030,859 | A * | 4/1962 | Elliott, Jr. | B29D 11/00942 |
| | | | | 425/808 |
| 3,160,039 | A * | 12/1964 | Pierre | B24B 9/142 |
| | | | | 82/13 |
| 3,171,317 | A * | 3/1965 | Clarke | B29C 37/02 |
| | | | | 83/507 |
| 3,750,272 | A * | 8/1973 | Gomond | B24B 9/142 |
| | | | | 351/159.02 |
| 4,326,325 | A | 4/1982 | Chambers et al. | |
| 4,516,301 | A * | 5/1985 | Westerman, Jr. | G11B 23/0021 |
| 4,518,551 | A * | 5/1985 | Lin | B29C 37/02 |
| | | | | 264/296 |
| 4,534,723 | A * | 8/1985 | Rawlings | B29D 11/00932 |
| | | | | 408/19 |
| 4,535,223 | A * | 8/1985 | Westerman, Jr. | B29C 35/08 |
| | | | | 392/419 |
| 4,569,807 | A * | 2/1986 | Boudet | B29D 11/00413 |
| | | | | 264/161 |
| 4,647,261 | A * | 3/1987 | Schaffner | B29C 37/02 |
| | | | | 408/180 |
| 4,847,020 | A | 7/1989 | Akhavi | |
| 4,995,286 | A * | 2/1991 | Kobayashi | B29C 37/02 |
| | | | | 82/47 |
| 6,368,096 | B1 * | 4/2002 | Dobner | B29D 11/00586 |
| | | | | 425/231 |
| 7,166,334 | B2 * | 1/2007 | Komaki | B29C 35/0888 |
| 8,074,550 | B2 * | 12/2011 | Huang | B26D 5/02 |
| | | | | 425/806 |
| 11,938,695 | B2 * | 3/2024 | Olivieri | B29D 11/00432 |

FOREIGN PATENT DOCUMENTS

| | | | | |
|---|---|---|---|---|
| JP | 04221621 | A * | 8/1992 | .......... B29C 45/382 |
| JP | 2004017127 | A * | 1/2004 | |
| KR | 100769469 | B1 * | 10/2007 | |
| TW | 1224553 | B * | 12/2004 | |
| WO | WO-2007009429 | A1 * | 1/2007 | .......... B23D 79/005 |

* cited by examiner

FIG. 2D ns
DEFLASHING MACHINE AND METHOD OF DEFLASHING A LENS-MOLD-ASSEMBLY

CROSS-REFERENCE TO RELATED APPLICATIONS

This application is a national phase application under 35 U.S.C. § 371 of International Application No. PCT/EP2021/070693 filed 23 Jul. 2021, which claims priority to European Patent Application No. 20305855.7 filed 24 Jul. 2020. The entire contents of each of the above-referenced disclosures is specifically incorporated by reference herein without disclaimer.

TECHNICAL FIELD OF THE INVENTION

Various embodiments generally relate to a deflashing machine. In particular, various embodiments generally relate to a deflashing machine for removing a flash on a lens-mold-assembly after molding. Various embodiments also relate to a method of deflashing a lens-mold-assembly after molding.

BACKGROUND INFORMATION AND PRIOR ART

Conventional method for removing flashes on a lens-mold-assembly after molding or polymerization of liquid molding material is via a manual process. Typically, the lens-mold-assembly is formed by filling liquid molding material into a cavity between two molding shells with a tape holding the two molding shells together along the perimeter thereof. After the molding process or the polymerization of the liquid molding material whereby the liquid molding material is hardened to form a molded lens held between the two molding shells, the tape is removed. During the molding process or the polymerization of the liquid molding material, the liquid molding material may seep in between the tape and/or the molding shells or may seep out of the tape forming flashes on the lens-mold-assembly. After the removal of the tape, the lens-mold-assembly is being check for flashes and the flashes are being removed. The flashes on the lens-mold-assembly are typically removed manually by an operator. To do so, the operator will manually remove the tape around the lens-mold-assembly and scratch or scrape the lens-mold-assembly edge and surface with a customized tool. However, this manual deflashing process is time consuming, not ergonomic and dependent on the operator's skill. Accordingly, the main problem in such manual process is a problem of efficiency. For example, the manual process limits production yield, is dependent on operator's skill and productivity is affected by human fatigue.

An automatic trimming device is known from CN109676840 which disclosed a silicone insulator trimming device.

Accordingly, there is a need to provide a more efficient solution with high accuracy for deflashing of the lens-mold-assembly to address at least some of the issues in the lens manufacturing process.

SUMMARY OF THE INVENTION

The invention concerns a deflashing machine as described in claims 1 to 14.

The invention also concerns a method of deflashing a lens-mold-assembly as described in claim 15.

According to various embodiments, there is provided a deflashing machine for removing a flash on a lens-mold-assembly after molding. The machine may include a lens-mold-assembly-rotation mechanism having a first rotary part and a second rotary part coaxially aligned. The first rotary part and the second rotary part may be operable to be axially spaced from each other along a common axis for holding the lens-mold-assembly therebetween. Each of the first rotary part and the second rotary part may be rotatable about the common axis. The machine may include a deflashing mechanism. The deflashing mechanism may include a first blade disposed at a first radial position from the common axis. The first blade may have a trimming edge parallel to the common axis for engaging a circumferential surface of the lens-mold-assembly held between the first rotary part and the second rotary part. The deflashing mechanism may include a second blade disposed at a second radial position from the common axis. The second blade may have a trimming edge radially aligned with respect to the common axis. The trimming edge of the second blade may be for engaging a convex surface or a concave surface of the lens-mold-assembly held between the first rotary part and the second rotary part.

According to various embodiments, there is provided a method of deflashing a lens-mold-assembly after molding. The method may include rotating the lens-mold-assembly held between coaxially aligned first and second rotary parts of a lens-mold-assembly-rotation mechanism of a deflashing machine, wherein the first and second rotary parts may be axially spaced from each other along a common axis for holding the lens-mold-assembly therebetween, and wherein the first and second rotary parts may be rotatable about the common axis to rotate the lens-mold-assembly. The method may include engaging a circumferential surface of the lens-mold-assembly with a trimming edge of a first blade of a deflashing mechanism of the deflashing machine, wherein the first blade may be disposed at a first radial position from the common axis and the trimming edge of the first blade may be parallel to the common axis. The method may include engaging a convex surface or a concave surface of the lens-mold-assembly with a trimming edge of a second blade of the deflashing mechanism of the deflashing machine, wherein the second blade may be disposed at a second radial position from the common axis and the trimming edge of the second blade may be radially aligned with respect to the common axis.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

On the appended drawings.

DETAILED DESCRIPTION OF EMBODIMENTS

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

It should be understood that the terms "on", "over", "top", "bottom", "down", "side", "back", "left", "right", "front", "lateral", "side", "up", "down" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

Various embodiments seek to provide a deflashing machine for removing a flash on a lens-mold-assembly after molding, and a method of deflashing a lens-mold-assembly after molding. The lens-mold-assembly may include a tri-layer intermediate structure having two molding shells with a molded lens therebetween. The two molding shells may include a concave molding shell forming a top mold and a convex molding shell forming a bottom mold. The molded lens may be formed between the concave molding shell and the convex molding shell. Accordingly, a convex surface of the concave molding shell may form a top surface of the lens-mold-assembly and a concave surface of the convex molding shell may form a bottom surface of the lens-mold-assembly. During molding, flashes may be formed on the lens-mold-assembly due to seepage of the liquid molding material. Various embodiments seek to provide a repeatable, quick and accurate solution for deflashing the lens-mold-assembly such that the tri-layer intermediate structure may be cleaned up and be free of flashes so as to be ready for subsequent disassembly to retrieve the molded lens. Various embodiments may minimize or eliminate the dependency on operator's skill and productivity for deflashing. Various embodiments may perform deflashing for a lens-mold-assembly in a fully automated manner whereby scratching or scraping of the flashes from an edge surface and a main surface of the lens-mold-assembly may be automatic. Various embodiments may also provide a high accuracy for scratching or scraping of the flashes as well as a reliable and repeatable tape deflashing process to allow a sustained continuous operation for multiple lens-mold-assemblies one after another so as to ensure a high productivity output.

In various embodiments, deflashing or flashes cleaning may be performed by metallic blades held in a certain or predetermined orientation to maximize flashes removal efficiency while not damaging the lens-mold-assembly. According to various embodiments, a minimum of two blades may be required. The two blades may include a blade (or a first blade or an edge cleaning blade) to clean the edge surface (or a circumferential surface) of the lens-mold-assembly and another blade (or a second blade or a surface cleaning blade) to clean a main surface of the lens-mold-assembly, for example the convex surface (or top surface) and/or the concave surface (or bottom surface) of the lens-mold-assembly. According to various embodiments, each blade may be mounted on a biasing arrangement, such as a spring system, to ensure that a trimming edge of the blade follow accurately the shape of the lens-mold-assembly, i.e. the edge surface and/or the convex surface and/or the concave surface of the lens-mold-assembly. The biasing arrangement may compensate for any misalignment of the lens-mold-assembly onto the deflashing machine or misalignment between the two molding shells during the molding process.

According to various embodiments, the edge cleaning blade and the surface cleaning blade may both be mounted on individual holders. These holders may be pushed forward and backward by actuators, such as electrical or pneumatic actuators. According to various embodiments, each blade may enter into contact with the edge surface of the lens-mold-assembly or the convex surface of the lens-mold-assembly or the concave surface of the lens-mold-assembly with a specific or predetermined angle. According to various embodiments, the lens-mold-assembly may be rotated such that the edge cleaning blade and the surface cleaning blade may remove flashes off the lens-mold-assembly. According to various embodiments, the deflashing or cleaning results may be optimized based on a combination of the blade force, the lens-mold-assembly rotation speed and the angle at which the blade contact the lens-mold-assembly. For example, for optimized results, a pushing force of the actuator pushing the blade may not exceed 100N and the lens-mold-assembly may be rotating at a minimal speed of 60 RPM. Further, the angle between a surface of the edge cleaning blade and a normal vector from the circumferential surface of the lens-mold-assembly may be between 1° and 90° while the angle between a surface of the surface cleaning blade and a normal vector from the convex surface of the lens-mold-assembly may be between 5° and 40°.

According to various embodiments, there is provided an automatic deflashing machine for removing the flashes on the lens-mold-assembly after molding. According to various embodiments, the deflashing process may be completed within 12 seconds/lens. In other words, in every 12 seconds, the deflashing machine may remove flashes from the edge surface and the main surface of one lens-mold-assembly. Further, the automatic deflashing machine may have an accuracy that results in 95% to 100% of the lens-mold-assemblies being processed to be free of flashes.

Figure 1A:
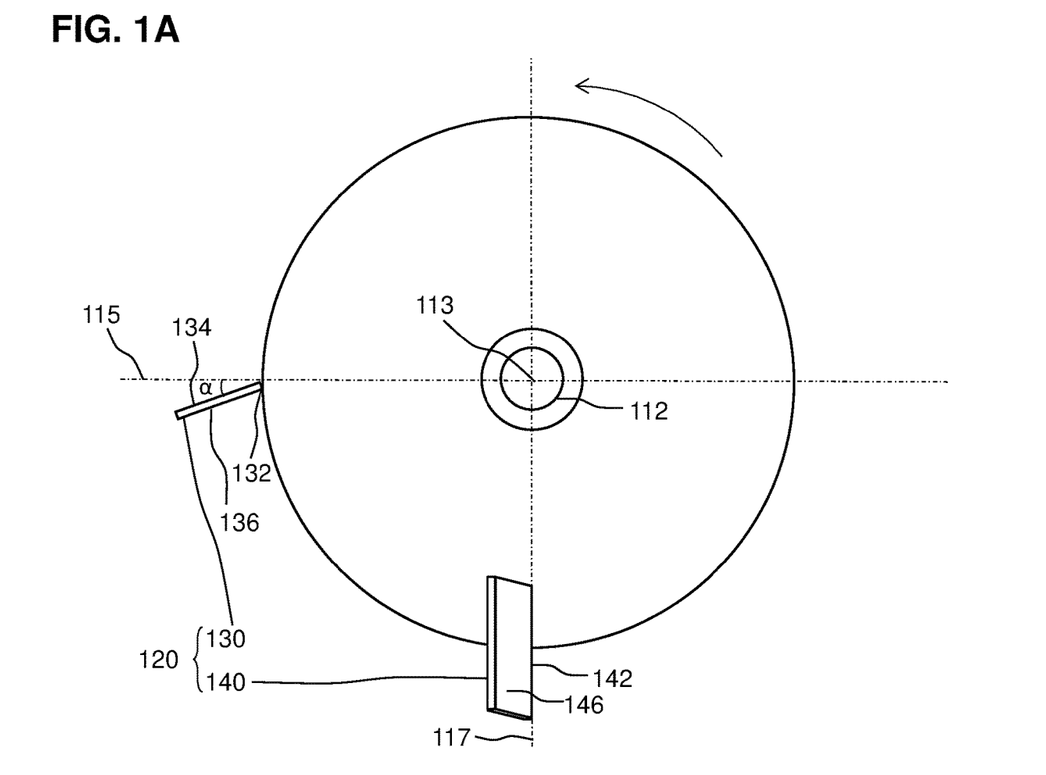
FIG. 1A depicts a schematic top view of a deflashing machine for removing a flash on a lens-mold-assembly after molding according to various embodiments.
Figure 1B:
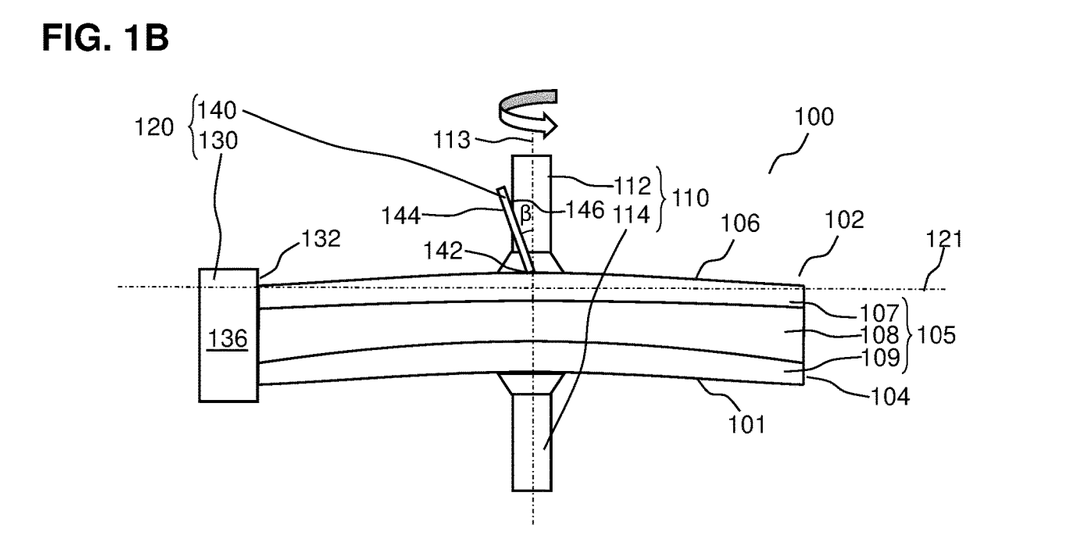
FIG. 1B depicts a schematic front view of the deflashing machine of FIG. 1A according to various embodiments.
Figure 1C:
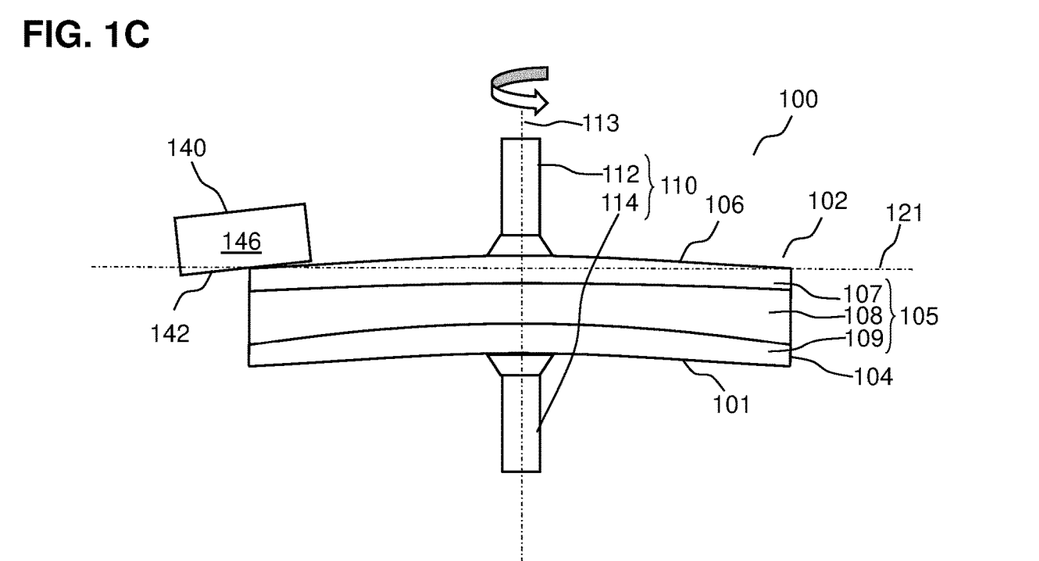
FIG. 1C depicts a schematic side view of the deflashing machine of FIG. 1A according to various embodiments.

FIG. 1A depicts a schematic top view of a deflashing machine 100 for removing a flash on a lens-mold-assembly 102 after molding according to various embodiments. FIG. 1B depicts a schematic front view of the deflashing machine 100 according to various embodiments. FIG. 1C depicts a schematic side view of the deflashing machine 100 according to various embodiments.

According to various embodiments, the lens-mold-assembly 102 may be an intermediate assembly of a lens manufacturing process. The lens-mold-assembly 102 may include a tri-layer intermediate structure 105 having a first mold part 107 (or a first molding shell), a second mold part 109 (or a second molding shell), and a molded lens 108 sandwiched therebetween. The first mold part 107 may be a concave molding shell forming a top mold and the second mold part 109 may be a convex molding shell forming a bottom mold. The molded lens may be formed between the first mold part 107 and the second mold part 109. Accordingly, a convex surface 106 of the first mold part 107, which is in the form of the concave molding shell, may form a top surface of the lens-mold-assembly 102 and a concave surface 101 of the second mold part 109, which is in the form of the convex molding shell, may form a bottom surface of the lens-mold-assembly 102. According to various embodiments, a circumferential surface 104 (or an edge surface) of the lens-mold-assembly 102 may be a surface encircling the lens-mold-assembly 102 which extends between the top surface of the lens-mold-assembly 102 (or the convex surface 106 of the first mold part 107) and the bottom surface of the lens-mold-assembly 102 (or the concave surface 101 of the second mold part 109). According to various embodiments, the lens-mold-assembly 102 may be in the form of a disc or a plate or a panel having a circular shape.

Referring to FIG. 1, according to various embodiments, the deflashing machine 100 may include a lens-mold-assembly-rotation mechanism 110. The lens-mold-assembly-rotation mechanism 110 may be configured to hold and rotate the lens-mold-assembly 102 about an axis extending perpendicular through the first mold part 107, the molded lens 108 and the second mold part 109. According to various embodiments, the lens-mold-assembly-rotation mechanism 110 may include a first rotary part 112 and a second rotary part 114 coaxially aligned. Accordingly, the first rotary part 112 and the second rotary part 114 may lie on a common axis 113. Each of the first rotary part 112 and the second rotary part 114 may be rotatable about the common axis 113. Accordingly, a rotational axis of the first rotary part 112 and a rotational axis of the second rotary part 114 may coincide with the common axis 113. According to various embodiments, the lens-mold-assembly-rotation mechanism 110 may include at least one rotary actuator coupled to the first rotary part 112 and the second rotary part 114. According to various embodiments, the lens-mold-assembly-rotation mechanism 110 may include a first rotary actuator coupled to the first rotary part 112 and a second rotary actuator coupled to the second rotary part 114.

Further, according to various embodiments, the first rotary part 112 and the second rotary part 114 may be operable to be axially spaced from each other along the common axis for holding the lens-mold-assembly 102 therebetween. Accordingly, the first rotary part 112 and the second rotary part 114 may be separated along the common axis 113 such that there is a space or a gap or a distance between the first rotary part 112 and the second rotary part 114 along the common axis 113, whereby the space or the gap or the distance is sufficient for holding the lens-mold-assembly 102. Hence, the lens-mold-assembly 102 may be fitted or placed or inserted into the space or the gap or the distance between the first rotary part 112 and the second rotary part 114 in a manner such that the lens-mold-assembly 102 may be sandwiched or clamped or held between the first rotary part 112 and the second rotary part 114. According to various embodiments, when the lens-mold-assembly 102 is sandwiched or clamped or held between the first rotary part 112 and the second rotary part 114, the lens-mold-assembly 102 may be rotated by the first rotary part 112 and the second rotary part 114. Accordingly, the lens-mold-assembly 102, the first rotary part 112 and the second rotary part 114 may together function as a single article or unit and may be rotatable together about the common axis 113. Hence, when the lens-mold-assembly 102 is sandwiched or clamped or held between the first rotary part 112 and the second rotary part 114, there may not be any relative rotation about the common axis 113 between each other or they may be non-rotatable relative to each other about the common axis 113.

According to various embodiments, the lens-mold-assembly 102 may be held by the first rotary part 112 and the second rotary part 114 in an orientation perpendicular to the common axis 113. Accordingly, each of the first mold part 107, the molded lens 108 and the second mold part 109 may be perpendicular to the common axis 113 such that the common axis 113 extends perpendicularly through the tri-layer intermediate structure 105 of the lens-mold-assembly 102. Hence, the lens-mold-assembly 102 may be held with a thickness direction of the lens-mold-assembly 102 being parallel to the common axis 113.

According to various embodiments, the deflashing machine 100 may include a deflashing mechanism 120. According to various embodiments, the deflashing mechanism 120 may be configured to deflash the lens-mold-assembly 102 while the lens-mold-assembly 102 is being rotated by the lens-mold-assembly-rotation mechanism 110. According to various embodiments, the deflashing mechanism 120 may be aligned with the space or the gap or the distance along the common axis 113 between the first rotary part 112 and the second rotary part 114 of the lens-mold-assembly-rotation mechanism 110. Accordingly, the lens-mold-assembly held between the first rotary part 112 and the second rotary part 114 may be aligned to the deflashing mechanism 120 such that the deflashing mechanism 120 may be operable to deflash the circumferential surface 104 and the main surface, i.e. the convex surface 106 and/or the concave surface 101, of the lens-mold-assembly.

According to various embodiments, the deflashing mechanism 120 may include a first blade 130 disposed at a first radial position from the common axis 113. According to various embodiments, the first blade 130 may lie in a transverse plane 121 (or a horizontal plane or a lateral plane) which is perpendicular to the common axis 113 and which intersect the common axis 113 at the space or the gap or the distance between the first rotary part 112 and the second rotary part 114 along the common axis 113. It should be understood that the phrase "the first blade 130 may lie in a transverse plane 121", when used in the description are used for convenience and is understood to mean that the first blade 130 is considered to lie in the transverse plane 121 as long as any portions of the first blade 130 intersect the transverse plane 121. According to various embodiments, the transverse plane 121 may intersect a rim of the lens-mold-assembly 102 held between the first rotary part 112 and the second rotary part 114 whereby the rim is where the circumferential surface 104 and the convex surface 106 meet. According to various embodiments, the first blade 130 may be positioned at a predetermined distance in a radial direction (or radiating) from the common axis 113. According to various embodiments, the first blade 130 at the first radial position may be stationary with respect to the common axis 113. According to various embodiments, the predetermined distance in the first radial direction may be based on a radius of the lens-mold-assembly 102 or a length of a straight line extending from a center of the lens-mold-assembly 102 to the perimeter of the lens-mold-assembly 102.

According to various embodiments, the first blade 130 may include a trimming edge 132. According to various embodiments, the trimming edge 132 may be parallel to the common axis 113 for engaging the circumferential surface 104 of the lens-mold-assembly 102 held between the first rotary part 112 and the second rotary part 114. According to various embodiments, the trimming edge 132 of the first blade 130 may be a thin or sharp border of the first blade 130 for contacting the circumferential surface 104 of the lens-mold-assembly 102 so as to trim or remove flashes on the circumferential surface 104. According to various embodiments, the trimming edge 132 may be straight. With the trimming edge 132 of the first blade 130 parallel to the common axis 113, the trimming edge 132 of the first blade 130 may be aligned axially to the circumferential surface 104 of the lens-mold-assembly 102 such that the trimming edge 132 may engage across a height of the circumferential surface 104 of the lens-mold-assembly 102.

According to various embodiments, the deflashing mechanism 120 may include a second blade 140 disposed at a second radial position from the common axis 113. According to various embodiments, the second blade 140 may lie in the transverse plane 121. It should be understood that the phrase "the second blade 140 may lie in the transverse plane 121", when used in the description are used for convenience and is understood to mean that the second blade 140 is considered to lie in the transverse plane 121 as long as any portions of the second blade 140 intersect the transverse plane 121. According to various embodiments, the second blade 140 may be positioned at a predetermined distance in a radial direction (or radiating) from the common axis 113. According to various embodiments, the second blade 140 at the second radial position may be stationary with respect to the common axis 113. According to various embodiments, a maximum distance of the predetermined distance in the second radial direction may be a radius of the lens-mold-assembly 102 or a length of a straight line extending from a center of the lens-mold-assembly 102 to the perimeter of the lens-mold-assembly 102.

According to various embodiments, the first radial position of the first blade 130 and the second radial position of the second blade 140 may be angularly spaced apart with respect to the common axis 113. For example, the first radial position of the first blade 130 and the second radial position of the second blade 140 may be angularly spaced 90° apart with respect to the common axis 113. According to various embodiments, the first radial position of the first blade 130 and the second radial position of the second blade 140 may be angularly spaced between 1° to 180° apart with respect to the common axis 113.

According to various embodiments, the second blade 140 may include a trimming edge 142. According to various embodiments, the trimming edge 142 may be radially aligned with respect to the common axis 113. Accordingly, the trimming edge 142 may be aligned to a radial direction extending outwards from the common axis 113. According to various embodiments, the trimming edge 142 of the second blade 140 may be for engaging the convex surface 106 (or the concave surface 101) of the lens-mold-assembly 102 held between the first rotary part 112 and the second rotary part 114. While FIG. 1A, FIG. 1B and FIG. 1C shows the trimming edge 142 of the second blade 140 engaging the convex surface 106 of the lens-mold-assembly 102, it is understood that the trimming edge 142 of the second blade 140 may be arranged and/or oriented and/or configured to engage the concave surface 101 of the lens-mold-assembly 101. According to various embodiments, the trimming edge 142 of the second blade 140 may be a thin or sharp border of the second blade 140 for contacting the convex surface 106 (or the concave surface 101) of the lens-mold-assembly 102 so as to trim or remove flashes on the convex surface 106 (or the concave surface 101).

According to various embodiments, as shown, when the trimming edge 142 of the second blade 140 is for engaging the convex surface 106 of the lens-mold-assembly 102, the trimming edge 142 may be inclined at an angle from the transverse plane 121, which is perpendicular to the common axis 113. Accordingly, the trimming edge 142 may slant towards the common axis 113 such that a vector of the trimming edge 142 which extends to intersect the common axis 113 may form an angle that is less than 90° with the common axis 113. According to various embodiments, the trimming edge 142 may be straight. With the trimming edge 142 of the second blade 140 slanted towards the common axis 113, the trimming edge 142 of the second blade 140 may be aligned tangentially to a curvature of the convex surface 106 of the lens-mold-assembly 102 such that the trimming edge 142 may engage radially inwards across the convex surface 106 of the lens-mold-assembly 102 from a perimeter of the of the lens-mold-assembly 102.

According to various embodiments, the trimming edge 132 of the first blade 130 and the common axis 113 may lie in a first radial plane 115. Accordingly, every points of the trimming edge 132 of the first blade 130 may lie in the first radial plane 115 or the entire trimming edge 132 of the first blade 130 may be a straight line in the first radial plane 115. Similarly, the common axis 113 may be a straight line in the first radial plane 115. Since the trimming edge 132 of the first blade 130 and the common axis 113 are parallel to each other, the trimming edge 132 of the first blade 130 and the common axis 113 may be two parallel lines in the first radial plane 115.

According to various embodiments, the first blade 130 may be angled away from the first radial plane 115 containing the common axis 113 and the trimming edge 132 of the first blade 130. According to various embodiments, a leading surface 134 of the first blade 130 and the first radial plane 115 may form a first angle α therebetween. According to various embodiments, the leading surface 134 of the first blade 130 may be a surface of the first blade 130 that is generally facing against the direction of rotation of the lens-mold-assembly 102. In other words, the leading surface 134 of the first blade 130 may be generally facing against the direction of rotation of the first and second rotary parts 112, 114 of the lens-mold-assembly-rotation mechanism 110. Accordingly, the leading surface 134 of the first blade 130 may be the surface of the first blade that meets the oncoming flash as the lens-mold-assembly 102 is being rotated by the first and second rotary parts 112, 114 of the lens-mold-assembly-rotation mechanism 110. According to various embodiments, the first angle α may be formed between the first blade 130 and the first radial plane 115 with the leading surface 134 of the first blade 130 facing or opposing the first radial plane 115. According to various embodiments, the first angle α formed between the leading surface 134 of the first blade 130 and the first radial plane 115 may be between 1° to 90°. According to various embodiments, a trailing surface 136 of the first blade 130 may be an opposite surface of the leading surface 134 of the first blade 130. Since the leading surface 134 of the first blade 130 is angled away from the first radial plane 115, the trailing surface 136 of the first blade 130 may be generally facing or directed towards a deflashed portion of the circumferential surface 104 of the lens-mold-assembly 102.

According to various embodiments, the trimming edge 142 of the second blade 140 and the common axis 113 may lie in a second radial plane 117. Accordingly, every points of the trimming edge 142 of the second blade 140 may lie in the second radial plane 115. According to various embodiments, when the trimming edge 142 of the second blade 140 is for engaging the convex surface 106 and the trimming edge 142 is straight, the entire trimming edge 142 of the second blade 140 may be a straight line in the second radial plane 117. Similarly, the common axis 113 may be a straight line in the second radial plane 117. Since the trimming edge 142 of the second blade 140 slant towards or is inclined towards the common axis 113, the trimming edge 142 of the second blade 140 and the common axis 113 may be two converging lines in the second radial plane 117.

According to various embodiments, since the first radial plane 115 and the second radial plane 117 contain the common axis 113, the common axis 113 may form an intersecting line between the first radial plane 115 and the second radial plane 117. According to various embodiments, an angle between the first radial plane 115 and the second radial plane 117 may be equivalent to the angular spacing between first radial position of the first blade 130 and the second radial position of the second blade 140 with respect to the common axis 113. For example, the angle between the first radial plane 115 and the second radial plane 117 may be 90° when the angular spacing between the first radial position of the first blade 130 and the second radial position of the second blade 140 is 90° with respect to the common axis 113. According to various embodiments, since the angular spacing between first radial position of the first blade 130 and the second radial position of the second blade 140 with respect to the common axis 113 may be between 1° to 180°, the angle between the first radial plane 115 and the second radial plane 117 may be between 1° to 180°.

According to various embodiments, when the second blade 140 is for engaging the convex surface 106, the second blade 140 may be angled away from the second radial plane 117 containing the common axis 113 and the trimming edge 142 of the second blade 140. According to various embodiments, a trailing surface 146 of the second blade 140 and the second radial plane 117 may form a second angle β therebetween. According to various embodiments, the trailing surface 146 of the second blade 140 may be a surface of the second blade 140 that is generally facing in the direction of rotation of the lens-mold-assembly 102. In other words, the trailing surface 146 of the second blade 140 may be generally facing or directed in a same direction of rotation of the first and second rotary parts 112, 114 of the lens-mold-assembly-rotation mechanism 110. Accordingly, the trailing surface 146 of the second blade 140 may be the surface of the second blade from which deflashed portions of the lens-mold-assembly 102 is being rotated away by the first and second rotary parts 112, 114 of the lens-mold-assembly-rotation mechanism 110. According to various embodiments, the second angle β may be formed between the second blade 140 and the second radial plane 117 with the trailing surface 146 of the second blade 140 facing or opposing the second radial plane 117. According to various embodiments, the second angle β formed between the trailing surface 146 of the second blade 140 and the second radial plane 117 may be between 0° to 90°, or preferably between 5° to 40°. According to various embodiments, when the second angle β is between 5° to 40°, the second blade 140 may be optimized for deflashing the convex surface 106 of the lens-mold-assembly 102. According to various embodiments, a leading surface 144 of the second blade 140 may be an opposite surface of the trailing surface 146 of the second blade 140. Since the trailing surface 146 of the second blade 140 is angled away from the second radial plane 117, the leading surface 144 of the second blade 140 may be generally facing or directed towards a portion of the convex surface 106 of the lens-mold-assembly 102 with oncoming flashes.

According to various embodiments, when the second angle β formed between the trailing surface 146 of the second blade 140 and the second radial plane 117 is 0°, the second blade 140 may be aligned to the second radial plane 117 containing the common axis 113 and the trimming edge 142 of the second blade 140 in a manner such that the second blade 140 may lie entirely in the second radial plane 117. Accordingly, the second blade 140 may lie flat in the second radial plane 117.

According to various embodiments, each of the first blade 130 and the second blade 140 of the deflashing mechanism 120 of the deflashing machine 200 may be made of metallic material.

Figure 2A:
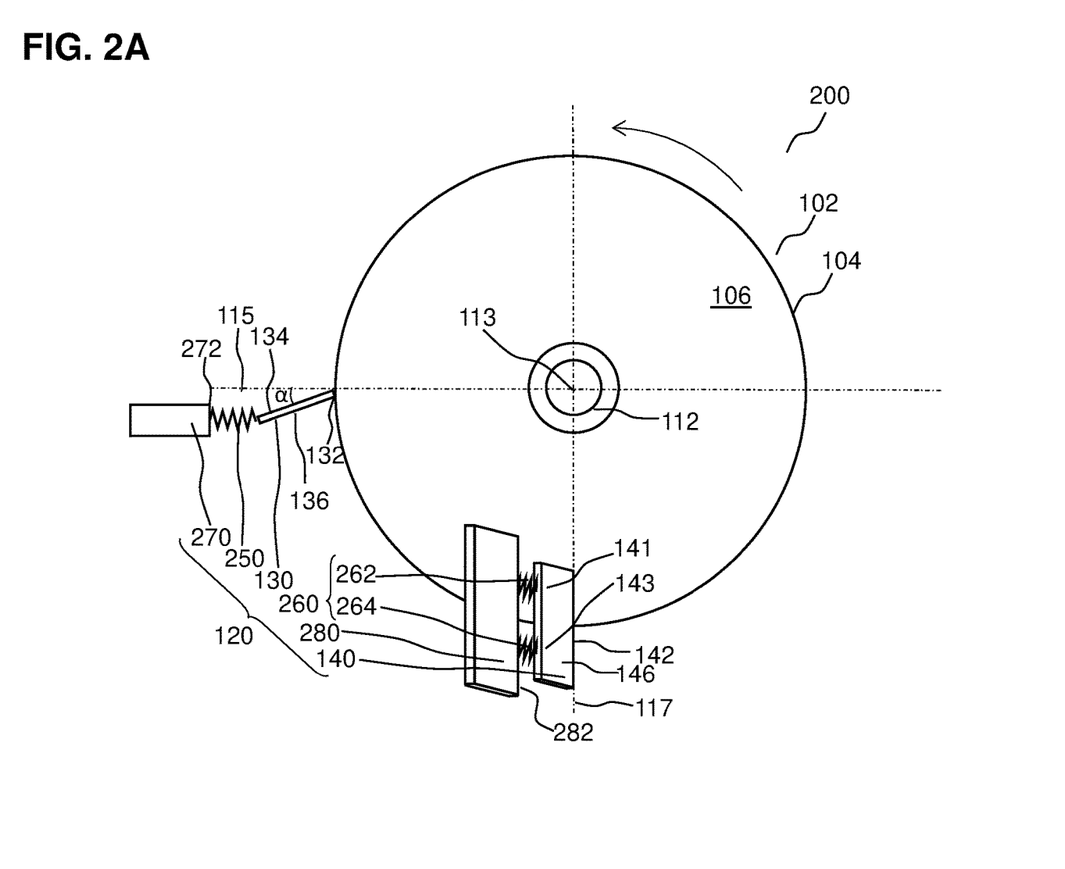
FIG. 2A depicts a schematic top view of a deflashing machine for removing a flash on a lens-mold-assembly after molding according to various embodiments.
Figure 2B:
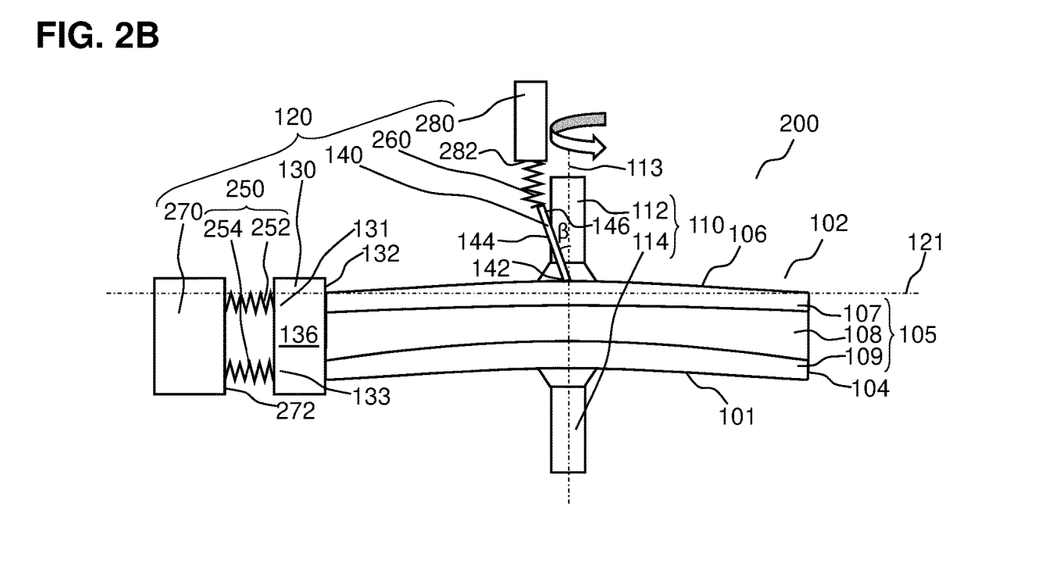
FIG. 2B depicts a schematic front view of the deflashing machine of FIG. 2A according to various embodiments.
Figure 2C:
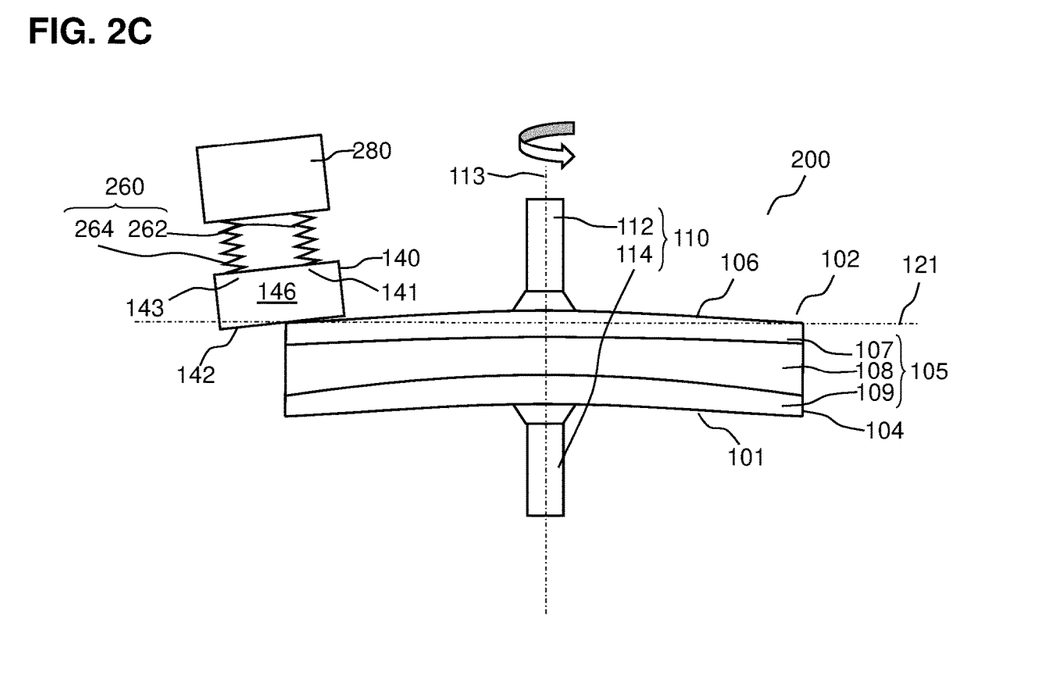
FIG. 2C depicts a schematic side view of the deflashing machine of FIG. 2A according to various embodiments.

FIG. 2A depicts a schematic top view of a deflashing machine 200 for removing a flash on a lens-mold-assembly 102 after molding according to various embodiments. FIG. 2B depicts a schematic front view of the deflashing machine 200 according to various embodiments. FIG. 2C depicts a schematic side view of the deflashing machine 200 according to various embodiments.

According to various embodiments, the deflashing machine 200 of FIG. 2A, FIG. 2B and FIG. 2C may contain all the features of the deflashing machine 100 of FIG. 1A, FIG. 1B, FIG. 1C. Accordingly, all features, changes, modifications, and variations that are applicable to the deflashing machine 100 of FIG. 1A, FIG. 1B, FIG. 1C may also be applicable to the deflashing machine 200 of FIG. 2A, FIG. 2B and FIG. 2C. According to various embodiments, the deflashing machine 200 of FIG. 2A, FIG. 2B and FIG. 2C may, similar to the deflashing machine 100 of FIG. 1A, FIG. 1B and FIG. 1C include the lens-mold-assembly-rotation mechanism 110 having the first rotary part 112 and the second rotary part 114, and the deflashing mechanism 120 having the first blade 130 and the second blade 140. According to various embodiments, the deflashing machine 200 of FIG. 2A, FIG. 2B and FIG. 2C may further include the following additional features and/or limitations.

According to various embodiments, the deflashing mechanism 120 of the deflashing machine 200 may include a first biasing arrangement 250. According to various embodiments, the first biasing arrangement 250 may be coupled to the first blade 130. According to various embodiments, the first biasing arrangement 250 may bias the first blade 130 in a manner so as to urge or push or bias the trimming edge 132 of the first blade 130 towards the circumferential surface 104 of the lens-mold-assembly 102 held between the first rotary part 112 and the second rotary part 114 of the lens-mold-assembly-rotation mechanism 110. Accordingly, the first biasing arrangement 250 may be configured to urge or push or bias the trimming edge 132 of the first blade 130 towards the common axis 113. Hence, the first biasing arrangement 250 may exert a force on the first blade 130 to push or urge or bias the first blade 130 in a manner such that the trimming edge 132 of the first blade 130 is pushed or urged or biased in a direction radially inward towards the common axis 113. According to various embodiments, the first biasing arrangement 250 may have a natural tendency or inclination to bias the first blade 130 for urging or pushing or biasing the trimming edge 132 of the first blade 130 towards the circumferential surface 104 of the lens-mold-assembly 102 when the first blade 130 is engaged with the circumferential surface 104 of the lens-mold-assembly 102.

According to various embodiments, the first biasing arrangement 250 may include one or more biasing elements coupled to the first blade 130 for biasing the first blade 130 to urge or push or bias the trimming edge 132 of the first blade 130 towards the circumferential surface 104 of the lens-mold-assembly 102 held between the first rotary part 112 and the second rotary part 114. According to various embodiments, the first biasing arrangement 250 may ensure good alignment between the first blade 130 and the circumferential surface 104 of the lens-mold-assembly 102.

According to various embodiments, the first biasing arrangement 250 may compensate for misalignment of the lens-mold-assembly 102 with the first and second rotary parts 112, 114 due to centering issues when holding the lens-mold-assembly 102 between the first and second rotary parts 112, 114. Accordingly, with the compensation from the first biasing arrangement 250, the first blade 130 may be in continuous and sustained engagement or contact with the circumferential surface 104 of the lens-mold-assembly 102 to follow the circumferential surface 104 of the lens-mold-assembly 102 for trimming or removal of the flashes as the lens-mold-assembly 102 rotates even if there is misalignment between the lens-mold-assembly 102 and the first and second rotary parts 112, 114.

According to various embodiments, the first biasing arrangement 250 may include a first bias element 252 and a second bias element 254. According to various embodiments, the first bias element 252 may be coupled to a first portion 131 of the first blade 130 and the second bias element 254 may be coupled to a second portion 133 of the first blade 130. According to various embodiments, the first portion 131 of the first blade 130 and the second portion 133 of the first blade 130 may be two different portions of the first blade 130 along a direction parallel to the trimming edge 132 of the first blade 130. Accordingly, the first bias element 252 and the second bias element 254 may be distributed along the first blade 130 in a manner so as to be spread out across the first blade 130 in the direction parallel to the trimming edge 132 of the first blade 130.

According to various embodiments, the first biasing arrangement 250 may include two to five bias elements coupled to the first blade 130 and distributed evenly along the direction parallel to the trimming edge 132 of the first blade 130. Accordingly, the first biasing arrangement 250 may include two, or three, or four, or five bias elements coupled to the first blade 130. Further, depending on the number of bias elements, the two to five bias elements may be coupled to the first blade 130 at regular interval across the first blade 130 in the direction parallel to the trimming edge 132 of the first blade 130. Hence each of the bias elements may be coupled to a corresponding portion of the first blade 130 spread out in the direction parallel to the trimming edge 132 of the first blade 130.

According to various embodiments, with the first biasing arrangement 250 having two to five bias elements coupled to the first blade 130, the first biasing arrangement 250 may compensate for misalignment in the tri-layer intermediate structure 105 of the lens-mold-assembly 102 resulting in a sloped contour at the circumferential surface 104 of the lens-mold-assembly 102 due to misalignment during molding. Accordingly, with the compensation from the first biasing arrangement 250 from the two to five bias elements arrangement, the first blade 130 may be tilted to follow any change in contour of the circumferential surface 104 of the lens-mold-assembly 102 so as to have continuous and sustained engagement or contact with the circumferential surface 104 of the lens-mold-assembly 102 for trimming or removal of the flashes as the lens-mold-assembly 102 rotates even if there is misalignment in the tri-layer intermediate structure 105 of the lens-mold-assembly 102.

According to various embodiments, the deflashing mechanism of the deflashing machine 200 may include a second biasing arrangement 260. According to various embodiments, the second biasing arrangement 260 may be coupled to the second blade 140 in a manner so as to urge or push or bias the trimming edge 142 of the second blade 140 towards the convex surface 106 (or the concave surface 101) of the lens-mold-assembly 102 held between the first rotary part 112 and the second rotary part 114 of the lens-mold-assembly-rotation mechanism 110. Accordingly, the second biasing arrangement 260 may be configured to urge or push or bias the trimming edge 142 of the second blade 140 substantially laterally along the second radial plane 117. Hence, the second biasing arrangement 260 may exert a force on the second blade 140 to push or urge or bias the second blade 140 in a manner such that the trimming edge 142 of the second blade 140 is pushed or urged or biased in a direction substantially perpendicular to the trimming edge 142 of the second blade 140 and along the second radial plane 117. According to various embodiments, the second biasing arrangement 260 may have a natural tendency or inclination to bias the second blade 140 for urging or pushing or biasing the trimming edge 142 of the second blade 140 towards the convex surface 106 (or the concave surface 101) of the lens-mold-assembly 102 when the second blade 140 is engaged or in contact with the convex surface 106 (or the concave surface 101) of the lens-mold-assembly 102.

According to various embodiments, the second biasing arrangement 260 may include one or more biasing elements coupled to the second blade 140 for biasing the second blade 140 to urge or push or bias the trimming edge 142 of the second blade 140 towards the convex surface 106 (or the concave surface 101) of the lens-mold-assembly 102 held between the first rotary part 112 and the second rotary part 114. According to various embodiments, the second biasing arrangement 260 may ensure good alignment between the second blade 140 and the convex surface 106 (or the concave surface 101) of the lens-mold-assembly 102.

According to various embodiments, the second biasing arrangement 260 may include a first bias element 262 and a second bias element 264. According to various embodiments, the first bias element 262 may be coupled to a first portion 141 of the second blade 140 and the second bias element 264 may be coupled to a second portion 143 of the second blade 140. According to various embodiments, the first portion 141 of the second blade 140 and the second portion 143 of the second blade 140 may be two different portions of the second blade 140 along a direction parallel to the trimming edge 142 of the second blade 140. Accordingly, the first bias element 262 and the second bias element 264 may be distributed along the second blade 140 in a manner so as to be spread out across the second blade 140 in the direction parallel to the trimming edge 142 of the second blade 140.

According to various embodiments, the second biasing arrangement 260 may include two to five bias elements coupled to the second blade 140 and distributed evenly along the direction parallel to the trimming edge 142 of the second blade 140. Accordingly, the second biasing arrangement 260 may include two, or three, or four, or five bias elements coupled to the second blade 140. Further, depending on the number of bias elements, the two to five bias elements may be coupled to the second blade 140 at regular interval across the second blade 140 in the direction parallel to the trimming edge 142 of the second blade 140. Hence each of the bias elements may be coupled to a corresponding portion of the second blade 140 spread out in the direction parallel to the trimming edge 142 of the second blade 140.

According to various embodiments, the second biasing arrangement 260 may compensate for misalignment of the lens-mold-assembly 102 with the first and second rotary parts 112, 114 due to centering issues when holding the lens-mold-assembly 102 between the first and second rotary parts 112, 114. Accordingly, with the compensation from the second biasing arrangement 260, the second blade 140 may be in continuous and sustained engagement with the convex surface 106 (or the concave surface 101) of the lens-mold-assembly 102 to follow the curvature of the convex surface 106 (or the concave surface 101) of the lens-mold-assembly 102 for trimming or removal of the flashes as the lens-mold-assembly 102 rotates even if there is misalignment between the lens-mold-assembly 102 and the first and second rotary parts 112, 114.

According to various embodiments, each biasing element of the first biasing arrangement 250 and the second biasing arrangement 260 may include, but not limited to, a spring, a compression spring, or a leaf spring. According to various embodiments, each biasing element of the first biasing arrangement 250 and the second biasing arrangement 260 may be configured to resist or oppose a compression force. For example, according to various embodiments, a maximum compression force for each biasing element of the first biasing arrangement 250 and the second biasing arrangement 260 may be equal or less than 60 N/mm, and a minimum compression force for each biasing element of the first biasing arrangement 250 and the second biasing arrangement 260 may be equal or less than 5 N/mm.

According to various embodiments, the deflashing mechanism 120 of the deflashing machine 200 may include a first actuator 270 coupled to the first blade 130. According to various embodiments, the first actuator 270 may be configured to move the first blade 130 to and away from the first radial position from the common axis 113. Accordingly, the first actuator 270 may move the first blade 130 forward and backward so as to engage with or disengage from the circumferential surface 104 of the lens-mold-assembly 102 held between the first rotary part 112 and the second rotary part 114. According to various embodiments, an actuated end 272 of the first actuator 270 may be coupled to the first blade 130 such that as the actuated end 272 of the first actuator 270 is moved upon actuation, the actuated end 272 may move the first blade 130 forward and backward for engaging with or disengaging from the circumferential surface 104 of the lens-mold-assembly 102.

According to various embodiments, the deflashing mechanism 120 of the deflashing machine 200 may include a second actuator 280 coupled to the second blade 140. According to various embodiments, the second actuator 280 may be configured to move the second blade 140 to and away from the second radial position from the common axis 113. Accordingly, the second actuator 280 may move the second blade 140 forward and backward so as to engage with or disengage from the convex surface 106 (or the concave surface 101) of the lens-mold-assembly 102 held between the first rotary part 112 and the second rotary part 114. According to various embodiments, an actuated end 282 of the second actuator 280 may be coupled to the second blade 140 such that as the actuated end 282 of the second actuator 280 is moved upon actuation, the actuated end 282 of the second actuator 280 may move the second blade 140 forward and backward for engaging with or disengaging from the convex surface 106 (or the concave surface 101) of the lens-mold-assembly 102.

According to various embodiments, each of the first actuator 270 and the second actuator 280 may include, but not limited to, an electrical actuator or a pneumatic actuator. According to various embodiments, each of the first actuator 270 and the second actuator 280 may be configured to provide a pushing force, which is not excessive, to the corresponding first and second blade 130, 140 such that the first and second blade 130, 140 may deflash the lens-mold-assembly 102 without damaging the lens-mold-assembly 102. For example, according to various embodiments, the pushing force provided by each of the first actuator 270 and the second actuator 280 for pushing the corresponding first and second blade 130, 140 may not exceed 100N and may not be less than 10N.

According to various embodiments, the first biasing arrangement 250 may be coupled between the first actuator 270 and the first blade 130. Accordingly, the first biasing arrangement 250 may connect the first blade 130 to the first actuator 270. Hence, the actuated end 272 of the first actuator 270 may be coupled to one side of the first biasing arrangement 250, and an opposite side of the first biasing arrangement 250 may be coupled to the first blade 130. According to various embodiments, the first biasing arrangement 250 may serve as a compliance mechanism or a suspension mechanism between the first actuator 270 and the first blade 130 so as to allow relative motion between the first actuator 270 and the first blade 130 when the first blade 130 is engaged with the circumferential surface 104 of the lens-mold-assembly 102 for compensating any misalignment of the lens-mold-assembly 102.

According to various embodiments, the second biasing arrangement 260 may be coupled between the second actuator 280 and the second blade 140. Accordingly, the second biasing arrangement 260 may connect the second blade 140 to the second actuator 280. Hence, the actuated end 282 of the second actuator 280 may be coupled to one side of the second biasing arrangement 260, and an opposite side of the second biasing arrangement 260 may be coupled to the second blade 140. According to various embodiments, the second biasing arrangement 260 may serve as a compliance mechanism or a suspension mechanism between the second actuator 280 and the second blade 140 so as to allow relative motion between the second actuator 280 and the second blade 140 when the second blade 140 is engaged with the convex surface 106 (or the concave surface 101) of the lens-mold-assembly 102 for compensating any misalignment of the lens-mold-assembly 102.

Figure 2D:
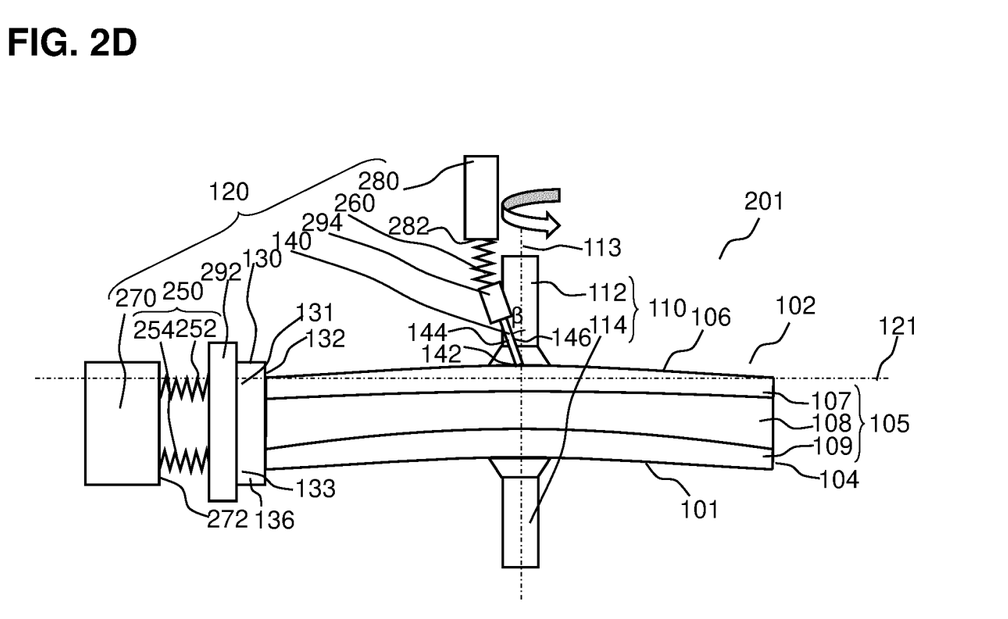
FIG. 2D depicts a schematic front view of a variant of the deflashing machine of FIG. 2A according to various embodiments.

FIG. 2D depicts a schematic front view of a deflashing machine 201, which is a variation of the deflashing machine 200 of FIG. 2A to FIG. 2C, according to various embodiments. According to various embodiments, the deflashing machine 201 of FIG. 2D includes all the features of the deflashing machine 200 of FIG. 2A, FIG. 2B, FIG. 2C. According to various embodiments, the deflashing machine 201 of FIG. 2D may further include the following additional features and/or limitations.

According to various embodiments, the deflashing mechanism 120 of the deflashing machine 201 may include a first blade holder 292 coupled to the first blade 130. Accordingly, the first biasing arrangement 250 may be coupled to the first blade 130 via the first blade holder 292. Hence, the first biasing arrangement 250 may be directly attached to the first blade holder 292, and the first blade holder 292 may be holding the first blade 130. According to various embodiments, with the first blade holder 292 holding the first blade 130, the first blade holder 292 may allow ease of maintenance and replacement of the first blade 130 without requiring dismantling of the first biasing arrangement 250 to remove the first blade 130.

According to various embodiments, the deflashing mechanism 120 of the deflashing machine 201 may include a second blade holder 294 coupled to the second blade 140. Accordingly, the second biasing arrangement 260 may be coupled to the second blade 140 via the second blade holder 294. Hence, the second biasing arrangement 260 may be directly attached to the second blade holder 294, and the second blade holder 294 may be holding the second blade 140. According to various embodiments, with the second blade holder 294 holding the second blade 140, the second blade holder 294 may allow ease of maintenance and replacement of the second blade 140 without requiring dismantling of the second biasing arrangement 260 to remove the second blade 140.

Referring to the deflashing machine 100 of FIG. 1A, FIG. 1B, FIG. 1C, the deflashing machine 200 of FIG. 2A, FIG. 2B, FIG. 2C, and the deflashing machine 201 of FIG. 2D. According to various embodiments, the first rotary part 112 and the second rotary part 114 of the lens-mold-assembly-rotation mechanism 110 may be linearly movable along the common axis 113. According to various embodiments, the first rotary part 112 and the second rotary part 114 may be linearly movable relative to each other along the common axis 113. According to various embodiments, the first rotary part 112 and the second rotary part 114 may be linearly movable towards or away from each other along the common axis 113. Accordingly, the first rotary part 112 and the second rotary part 114 may move in opposite directions towards or away from each other along the common axis 113. When the first rotary part 112 and the second rotary part 114 are moved towards each other, the lens-mold-assembly-rotation mechanism 110 may sandwich or clamp or hold the lens-mold-assembly 102 between the first rotary part 112 and the second rotary part 114. When the first rotary part 112 and the second rotary part 114 are moved away from each other, the lens-mold-assembly 102 may be removed from the lens-mold-assembly-rotation mechanism 110.

According to various embodiments, the first rotary part 112 and the second rotary part 114 of the lens-mold-assembly-rotation mechanism 110 may be further movable in a synchronous manner along the common axis 113 for moving the lens-mold-assembly 102 held therebetween to align with the deflashing mechanism 120. Accordingly, in addition to moving in opposite directions relative to each other, the first rotary part 112 and the second rotary part 114 may be movable in a same direction simultaneously in a coordinated manner such that the lens-mold-assembly 102 sandwiched or clamped or held between the first rotary part 112 and the second rotary part 114 may be moved along the common axis 113 for aligning to the deflashing mechanism 120. According to various embodiments, synchronously moving the first rotary part 112 and the second rotary part 114 along the common axis 113 may include upward movements as well as downward movements for fine tuning the alignment between the lens-mold-assembly 102 and the deflashing mechanism 120.

According to various embodiments, each of the first rotary part 112 and the second rotary part 114 may include a pad or a cup or a contact surface or any suitable element for respectively engaging the first mold part 107 and the second mold part 109 of the lens-mold-assembly 102.

According to various embodiments, each of the first rotary part 112 and the second rotary part 114 may be coupled to a linear actuator for moving along the common axis 113. For example, each of the first rotary part 112 and the second rotary part 114 may be coupled to a plunger or a piston or an extension rod or any other suitable elements of the linear actuator.

As illustrated in FIG. 1A to FIG. 1C and FIG. 2A to FIG. 2D is also a method of deflashing the lens-mold-assembly 102 after molding according to various embodiments. According to various embodiments, the method may include rotating the lens-mold-assembly 102 held between the coaxially aligned first and second rotary parts 112, 114 of the lens-mold-assembly-rotation mechanism 110 of the deflashing machine 100, 200, 201, wherein the first and second rotary parts 112, 114 may be axially spaced from each other along the common axis 113 for holding the lens-mold-assembly 102 therebetween, and wherein the first and second rotary parts 112, 114 may be rotatable about the common axis 113 to rotate the lens-mold-assembly 102. Accordingly, the lens-mold-assembly 102 may be rotated by the lens-mold-assembly-rotation mechanism 110 with the first and second rotary parts 112, 114 holding the lens-mold-assembly 102 therebetween and rotating the lens-mold-assembly 102 together with the first and second rotary parts 112, 114 as they are being rotated.

According to various embodiments, the method may include engaging the circumferential surface 104 of the lens-mold-assembly 102 with the trimming edge 132 of the first blade 130 of the deflashing mechanism 120 of the deflashing machine 100, 200, 201, wherein the first blade 130 may be disposed at the first radial position from the common axis 113 and the trimming edge 132 of the first blade 130 may be parallel to the common axis 113. Accordingly, the trimming edge 132 of the first blade 130 of the deflashing mechanism 120 may be brought into engagement with the circumferential surface 104 of the lens-mold-assembly 102 as the lens-mold-assembly 102 is being rotated such that the trimming edge 132 of the first blade 130 may deflash the circumferential surface 104 of the lens-mold-assembly 102.

According to various embodiments, the method may include engaging the convex surface 106 (or the concave surface 101) of the lens-mold-assembly 102 with the trimming edge 142 of the second blade 140 of the deflashing mechanism 120 of the deflashing machine 100, 200, 201, wherein the second blade 140 may be disposed at the second radial position from the common axis 113 and the trimming edge 142 of the second blade 140 may be radially aligned with respect to the common axis 113. Accordingly, the trimming edge 142 of the second blade 140 of the deflashing mechanism 120 may be brought into engagement with the convex surface 106 (or the concave surface 101) of the lens-mold-assembly 102 as the lens-mold-assembly 102 is being rotated such that the trimming edge 142 of the second blade 140 may deflash the convex surface 106 (or the concave surface 101) of the lens-mold-assembly 102. Further, when the method includes engaging the convex surface 106 of the lens-mold-assembly 102 with the trimming edge 142 of the second blade 140, the trimming edge 142 of the second blade 140 may be inclined at an angle from the transverse plane 121 perpendicular to the common axis 113.

According to various embodiments, the method may further include moving the first blade 130 of the deflashing mechanism 120 of the deflashing machine 100, 200, 201 to and away from the first radial position with respect to the common axis 113 for engaging the circumferential surface 104 of the lens-mold-assembly 102 with the trimming edge 132 of the first blade 130. According to various embodiments, moving the first blade 130 of the deflashing mechanism 120 of the deflashing machine 200, 201 may be via the first actuator 270.

According to various embodiments, the method may further include moving the second blade 140 of the deflashing mechanism 120 of the deflashing machine 100, 200, 201 to and away from the second radial position with respect to the common axis 113 for engaging the convex surface 106 (or the concave surface 101) of the lens-mold-assembly 102 with the trimming edge 142 of the second blade 140. According to various embodiments, moving the second blade 140 of the deflashing mechanism 120 of the deflashing machine 200, 201 may be via the second actuator 280.

According to various embodiments, the method may include moving the lens-mold-assembly 102, via the first and second rotary parts 112, 114 of the lens-mold-assembly-rotation mechanism 110 of the deflashing machine 100, 200, 201, along the common axis 113 to align a portion of the circumferential surface 104 of the lens-mold-assembly 102 to the first radial position with respect to the common axis 113 and to align a portion of the convex surface 106 (or the concave surface 101) of the lens-mold-assembly 102 to the second radial position with respect to the common axis 113 such that the first and second blades 130, 140 of the deflashing mechanism 120 may be moved into engagement with the circumferential surface 104 and the convex surface 106 (or the concave surface 101) of the lens-mold-assembly 102 respectively. Accordingly, after the lens-mold-assembly 102 is held between the first and second rotary parts 112, 114 of the lens-mold-assembly-rotation mechanism 110, the lens-mold-assembly-rotation mechanism 110 may move the first and second rotary parts 112, 114 along the common axis so as to align the lens-mold-assembly 102 to the deflashing machine 100, 200, 201.

According to various embodiments, the machine 100, 200, 201 may include a processor. In various embodiments, a "processor" may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with various embodiments. In various embodiments, the processor may be part of a computing system or a controller or a microcontroller or any other system providing a processing capability. According to various embodiments, such systems may include a memory which is for example used in the processing carried out by the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

According to various embodiments, the processor may be configured to generate various control signals for operating the various components of the machine 100, 200, 201. According to various embodiments, the processor may be configured to generate the various control signals so as to operate the machine 100, 200, 201 in accordance to the various methods as described herein. According to various embodiments, the processor may be configured to generate the various control signals in a pre-determined sequence based on the various methods as described herein. According to various embodiments, the processor may receive various detection signals from various sensor arrangements (for example, such as proximity sensors and/or contact sensors for detecting whether the lens-mold-assembly 102 is in position for deflashing), process the various detection signals, and generate corresponding control signals in response to the various detection signals for controlling various components of the machine 100, 200, 201. For example, the processor may be configured to control the lens-mold-assembly-rotation mechanism 110 to rotate the lens-mold-assembly 102; control the deflashing mechanism 120 to move the first blade 130 and the second blade 140 into engagement with the circumferential surface 104 and the convex surface 106 (or the concave surface 101) of the lens-mold-assembly 102 respectively; control the lens-mold-assembly-rotation mechanism 110 to stop rotation; and control the deflashing mechanism 120 to move to withdraw the first blade 130 and the second blade 140 such that the deflashed lens-mold-assembly 102 may be removed from the machine 100, 200, 201.

Various embodiments have provided a deflashing machine for removing a flash on a lens-mold-assembly and a method of deflashing a lens-mold-assembly after molding in an effective and repeatable manner. Various embodiments may be capable of rotating the lens-mold-assembly, automatic engaging trimming blades to the lens-mold-assembly, and accurately deflash the lens-mold-assembly. Accordingly, various embodiment may provide an efficient and high through-put process for deflashing of the lens-mold-assembly.

Although representative processes and articles have been described in detail herein, those skilled in the art will recognize that various substitutions and modifications may be made without departing from the scope of what is described and defined by the appended claims.

The invention claimed is:

1. A deflashing machine for removing a flash on a lens-mold-assembly after molding, the machine comprising:
 a lens-mold-assembly-rotation mechanism having a first rotary part and a second rotary part coaxially aligned, the first rotary part and the second rotary part being operable to be axially spaced from each other along a common axis for holding the lens-mold-assembly therebetween, each of the first rotary part and the second rotary part being rotatable about the common axis; and
 a deflashing mechanism comprising:
   a first blade disposed at a first radial position from the common axis, the first blade having a trimming edge parallel to the common axis for engaging a circumferential surface of the lens-mold-assembly held between the first rotary part and the second rotary part, and
   a second blade disposed at a second radial position from the common axis, the second blade having a trimming edge radially aligned with respect to the common axis, wherein the trimming edge of the second blade is for engaging a convex surface or a concave surface of the lens-mold-assembly held between the first rotary part and the second rotary part.

2. The machine of claim 1, wherein the trimming edge of the second blade is inclined at an angle from a transverse plane perpendicular to the common axis in a manner such that the trimming edge of the second blade is for engaging the convex surface of the lens-mold-assembly.

3. The machine of claim 1, wherein the deflashing mechanism further comprises a first biasing arrangement coupled to the first blade in a manner so as to bias the trimming edge of the first blade towards the circumferential surface of the lens-mold-assembly held between the first rotary part and the second rotary part.

4. The machine of claim 3, wherein the first biasing arrangement comprises a first bias element coupled to a first portion of the first blade and a second bias element coupled to a second portion of the first blade, the first portion and the second portion of the first blade being two different portions of the first blade along a direction parallel to the trimming edge of the first blade.

5. The machine of claim 4, wherein the first biasing arrangement comprises two to five bias elements coupled to the first blade and distributed evenly along the direction parallel to the trimming edge of the first blade.

6. The machine of claim 1, wherein the deflashing mechanism further comprises a second biasing arrangement coupled to the second blade in a manner so as to bias the trimming edge of the second blade towards the convex surface of the lens-mold-assembly held between the first rotary part and the second rotary part.

7. The machine of claim 6, wherein the second biasing arrangement comprises a first bias element coupled to a first portion of the second blade and a second bias element coupled to a second portion of the second blade, the first portion and the second portion of the second blade being two different portions of the first blade along a direction parallel to the trimming edge of the second blade.

8. The machine of claim 7, wherein the second biasing arrangement comprises two to five bias elements coupled to the second blade and distributed evenly along the direction parallel to the trimming edge of the second blade.

9. The machine of claim 1, wherein the first blade is angled away from a first radial plane containing the common axis and the trimming edge of the first blade in a manner such that a leading surface of the first blade and the first radial plane forms a first angle therebetween, preferably wherein the first angle formed between the leading surface of the first blade and the first radial plane is 1° to 90°.

10. The machine of claim 1, wherein the second blade is angled away from a second radial plane containing the common axis and the trimming edge of the second blade in a manner such that a trailing surface of the second blade and the second radial plane forms a second angle therebetween.

11. The machine of claim 10, wherein the trimming edge of the second blade is inclined at an angle from a transverse plane perpendicular to the common axis in a manner such that the trimming edge of the second blade is for engaging the convex surface of the lens-mold-assembly, and further wherein the second angle formed between the trailing surface of the second blade and the second radial plane is between 5° to 40°.

12. The machine of claim 1, wherein the second blade is aligned to a second radial plane containing the common axis and the trimming edge of the second blade in a manner such that the second blade lies in the second radial plane.

13. The machine of claim 1, wherein the deflashing mechanism comprises a first actuator coupled to the first blade, the first actuator configured to move the first blade to and away from the first radial position from the common axis.

14. The machine of claim 1, wherein the deflashing mechanism comprises a second actuator coupled to the second blade, the second actuator configured to move the second blade to and away from the second radial position from the common axis.

15. A method of deflashing a lens-mold-assembly after molding, the method comprising:

rotating the lens-mold-assembly held between coaxially aligned first and second rotary parts of a lens-mold-assembly-rotation mechanism of a deflashing machine, wherein the first and second rotary parts are axially spaced from each other along a common axis for holding the lens-mold-assembly therebetween, and wherein the first and second rotary parts are rotatable about the common axis to rotate the lens-mold-assembly;

engaging a circumferential surface of the lens-mold-assembly with a trimming edge of a first blade of a deflashing mechanism of the deflashing machine, wherein the first blade is disposed at a first radial position from the common axis and the trimming edge of the first blade is parallel to the common axis; and engaging a convex surface or a concave surface of the lens-mold-assembly with a trimming edge of a second blade of the deflashing mechanism of the deflashing machine, wherein the second blade is disposed at a second radial position from the common axis and the trimming edge of the second blade is radially aligned with respect to the common axis.

* * * * *